I. B. SNAPP.
ELECTRIC ALARM AND SIGNAL FOR AIR BRAKES.
APPLICATION FILED DEC. 4, 1911.
1,052,184.
Patented Feb. 4, 1913.
2 SHEETS—SHEET 1.
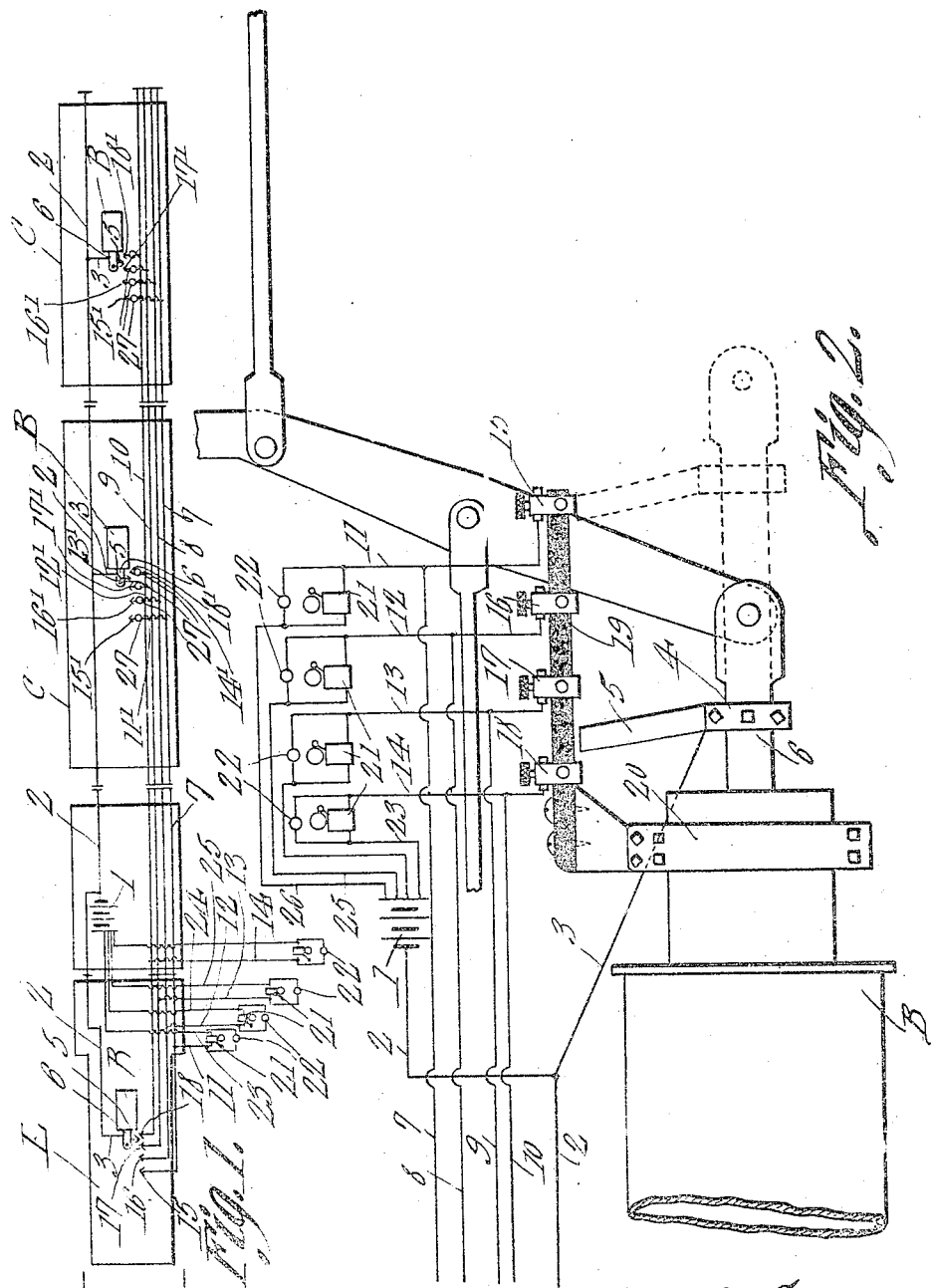

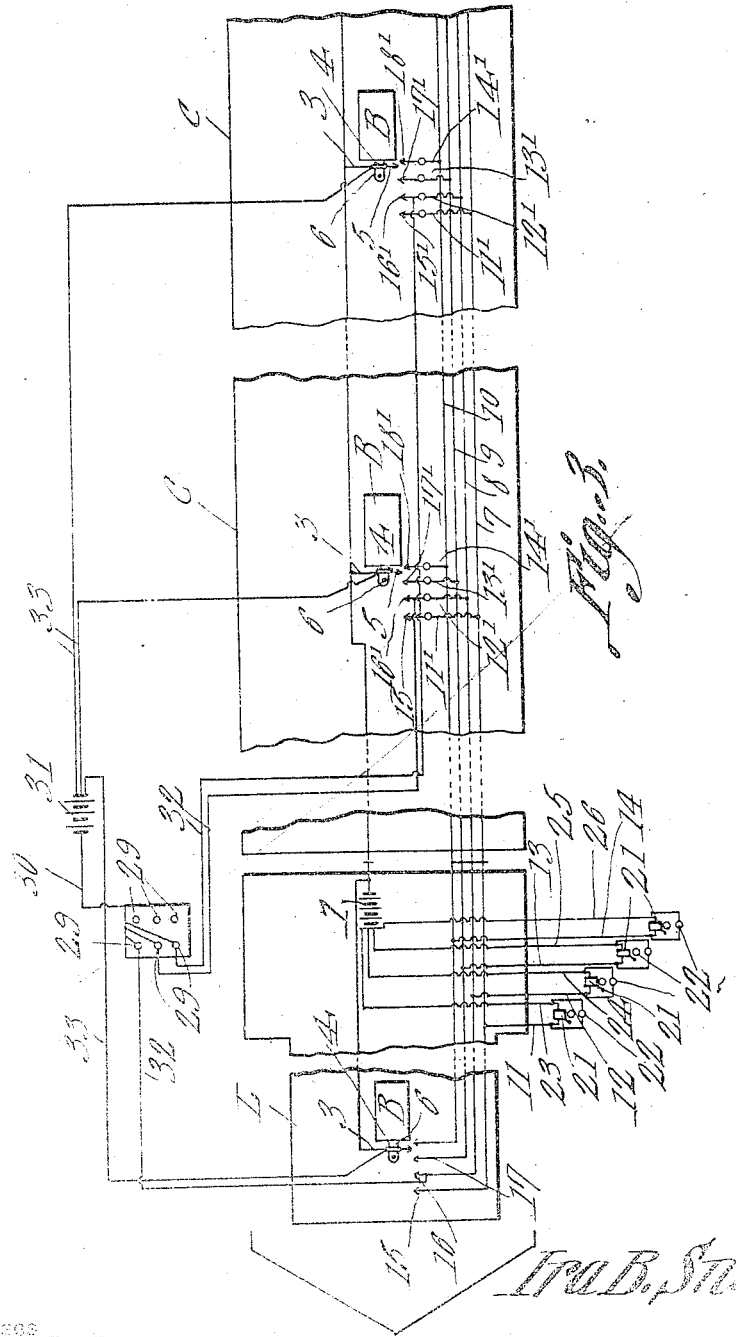

UNITED STATES PATENT OFFICE.

IRA B. SNAPP, OF CLIFTON FORGE, VIRGINIA.

ELECTRIC ALARM AND SIGNAL FOR AIR-BRAKES.

1,052,184.  Specification of Letters Patent.  Patented Feb. 4, 1913.

Application filed December 4, 1911. Serial No. 663,696.

*To all whom it may concern:*

Be it known that I, IRA B. SNAPP, a citizen of the United States, residing at Clifton Forge, in the county of Alleghany and State of Virginia, have invented a new and useful Electric Alarm and Signal for Air-Brakes, of which the following is a specification.

The present invention relates to improvements in electric alarms and signal devices for air brakes, the primary object of the invention being the provision of an apparatus disposed throughout the length of the train and provided with contact devices operably disposed with relation to the brake cylinders, or other moving parts, whereby the condition of the respective brakes throughout the train, that is whether set by application or by emergency, or by any breakage due to the breaking of parts of slide valve or the spring within the brake cylinder or the leakage of air therefrom, will be visually indicated in the cab of the locomotive and in the car affected, there being given an audible alarm in the cab of the locomotive simultaneously with the visual indication.

With the foregoing and other objects in view which will appear as the description proceeds, the invention resides in the combination and arrangement of parts and in the details of construction herein described and claimed, it being understood that changes in the precise embodiment of invention herein disclosed can be made within the scope of what is claimed without departing from the spirit of the invention.

In the drawings—Figure 1 is a diagrammatic view of the invention as applied to a locomotive and several cars. Fig. 2 is a view of a portion of the locomotive brake cylinder with a diagram of the electrical connection adjacent thereto mounted in the locomotive cab. Fig. 3 is a diagrammatic view showing in addition to the general alarm and signal system, a means for indication to the engineman or other operator, the individual condition of the respective brake cylinders.

Referring to the drawings, the numeral 1 designates the batteries, or any other source of electrical energy, preferably carried by the locomotive L. Leading from the batteries is a conductor 2 which is adapted to be extended throughout the length of the train with proper socket connections between the respective cars C, and having connected thereto adjacent to the respective brake cylinders B the short branch conductors 3. These branch conductors are connected to the respective movable contacts 4 each of which is provided with its contact terminal 5, said portion 4 thereof being connected to and carried by the brake cylinder piston 6.

Disposed throughout the length of the train are a series of four conductors 7, 8, 9 and 10, which with the conductor 2 in the respective cars are made into a cable, whereby the connections of the cable between the respective cars and locomotive, will form the proper circuit connections.

In the locomotive leading from the respective wires 7, 8, 9, and 10 are the branch wires 11, 12, 13 and 14 respectively, while connected to the same wires in the respective cars are the branch wires 11′, 12′, 13′ and 14′ respectively, the first set of wires having their terminals connected to the respective adjustable terminals or contacts 15, 16, 17 and 18 respectively, at the locomotive, while the second set is connected to similar terminals or contacts 15′, 16′, 17′ and 18′ respectively.

Connected to the branch conductors 11, 12, 13 and 14 respectively, are the audible signal 21 and the visual signal 22 while leading therefrom to the opposite side of the batteries to the conductor 2, are the branch conductors 23, 24, 25 and 26 respectively. By this means the visual and audible signals are operated in view and hearing of the engineman and indicate the exact cause and the condition of the brakes throughout the train, that is the contact 15 will indicate that some one of the brake cylinders is leaking to prevent the application of the brakes, contact 16 will indicate that the brakes are applied as desired, contact 17 will indicate an emergency application, while contact 18 will indicate any other condition not provided for in case the rod is moved too far toward the cylinder.

In order that the car may be located in which the trouble has arisen there is placed in the respective branch wires 11′, 12′, 13′ and 14′ the visual indicators 27.

The respective contacts 15, 15′, 16, 16′, 17, 17′, and 18, 18′, are connected adjustably to a bar 19 of insulation which is carried by a clamping sleeve 20 connected to the respective brake cylinders B, and elsewhere suitable, and by this means the same may be adjusted upon the said bar 19 in the proper relative position to be engaged by the contact arm 5 as the same is moved with the brake cylinder piston rod 6.

In Fig. 3, in addition to giving a general alarm and signal, as set forth, an annunciator 28 which is constructed similarly to the usual form of hotel or other indicator, is placed in the cab of the engine or in the motor operating end of a motor car, the same having a plurality of indicators 29 of any form having conductor 30 leading to the source of electrical energy 31, the conductors 33, being connected to the source 31, and to its individual moving contact 4, of the respective brake connection rods. Connected to the emergency contact of each set of brake cylinders is a conductor 32 which is connected to the individual pointer operating mechanism of the annunciator 28. Thus it will be seen that should any one or all of the brake cylinders be in emergency position, the indicator 29 of its respective brake cylinder would so indicate, these indicators 29 being energized only when the brake cylinder is in emergency position. The circuit closed to energize each indicator 29 for indicating the condition of the car brake cylinder, is as follows, viz:—the battery 31, the conductor 33, the collar 4, the arm 5, the emergency contact 16', the conductor 32, the proper indicator 29, and the conductor 30. In many cases, all but one of these circuits might be closed, it having been the intention of the engineman to operate all cylinders to emergency position, and under these conditions, the non-energized indicator 29 would immediately indicate to the engineman the exact cylinder not operating, so that the trouble could be located at once. Also by having indicators such as 29, the engineman can readily test out the sensitiveness of the various cylinders, so that he can learn to manipulate the engineer's valve to such a nicety as to bring all cars to the desired stop.

From the foregoing description taken in connection with the drawings, it is evident that the condition of the various brake cylinders throughout the train are indicated both visually and audibly to the engineman in the cab of the locomotive, and that by such means the engineman is notified so that he can manipulate his brakes to prevent any undue "setting" thereof and thus keep the train at all times under full control.

It is evident from the foregoing that this system of alarm and signal, may be applied with equal efficiency upon trolley cars, automobiles, or any class of vehicle in which it is desired that the condition of the brakes be at all times known.

What is claimed is:

1. In an electric signal for indicating the condition of an individual air-brake cylinder of a train to the engineman, in combination, a source of electrical energy, a conductor led from said source throughout the length of the train, branch conductors, one to each brake cylinder led from said conductor, a contact connected to and carried by the rod of each brake cylinder and connected to its respective branch conductor, a plurality of conductors led from the opposite side of the source and throughout the length of the train, branch conductors leading from each conductor of said plurality of conductors, there being a set of these branch conductors to each brake cylinder, a stationary contact connected to each of the last branch conductors and disposed in spaced relation to each other and in the path of to be engaged successively by the contact carried by the brake cylinder rod, and a translating device connected to each conductor of the plurality of conductors and mounted in view of the engineman.

2. In an electric signal for indicating the condition of an individual air-brake cylinder of a train to the engineman, in combination, a source of electrical energy, a conductor led from said source throughout the length of the train, branch conductors, one to each brake cylinder led from said conductor, a contact connected to and carried by the rod of each brake cylinder and connected to its respective branch conductor, a plurality of conductors led from the opposite side of the source and throughout the length of the train, branch conductors leading from each conductor of said plurality of conductors, there being a set of these branch conductors to each brake cylinder, a stationary contact connected to each of the last branch conductors and disposed in spaced relation to each other and in the path of to be engaged successively by the contact carried by the brake cylinder rod, a translating device connected to each conductor of the plurality of conductors and mounted in view of the engineman, and a translating device disposed in each one of the branch conductors, connected to the stationary contacts, to indicate locally the condition of its brake cylinder.

In testimony that I claim the foregoing as my own, I have hereto affixed my signature in the presence of two witnesses.

IRA B. SNAPP.

Witnesses:
SELINA WILLSON.
I. E. SIMPSON.